Dec. 8, 1964   W. R. LYNCH   3,159,886
SEALING STRIP WITH FOAMED-IN-PLACE FILLER
Filed April 20, 1962   2 Sheets-Sheet 1
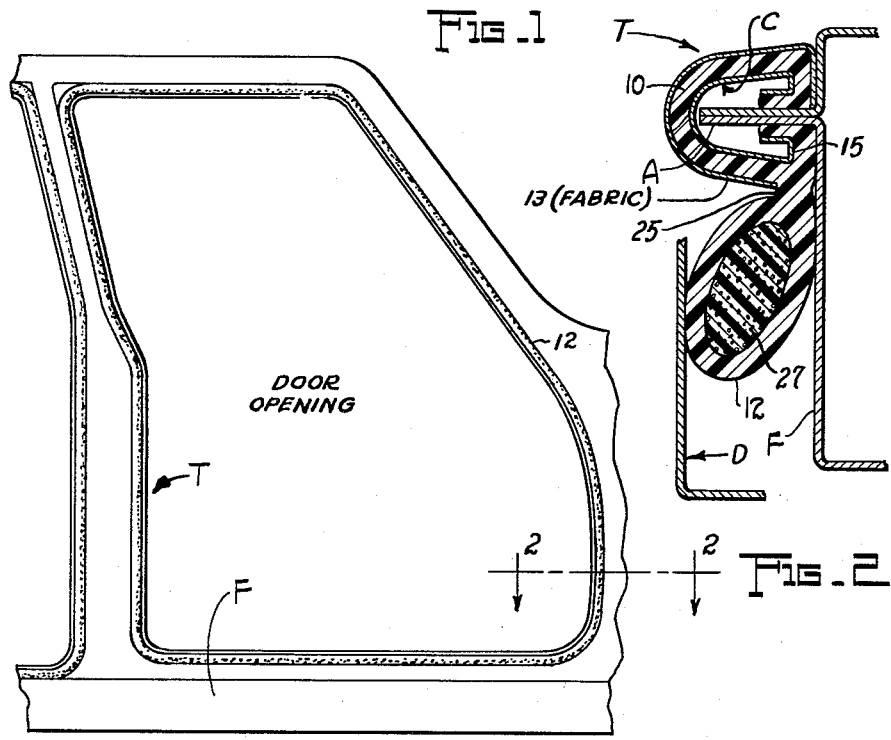
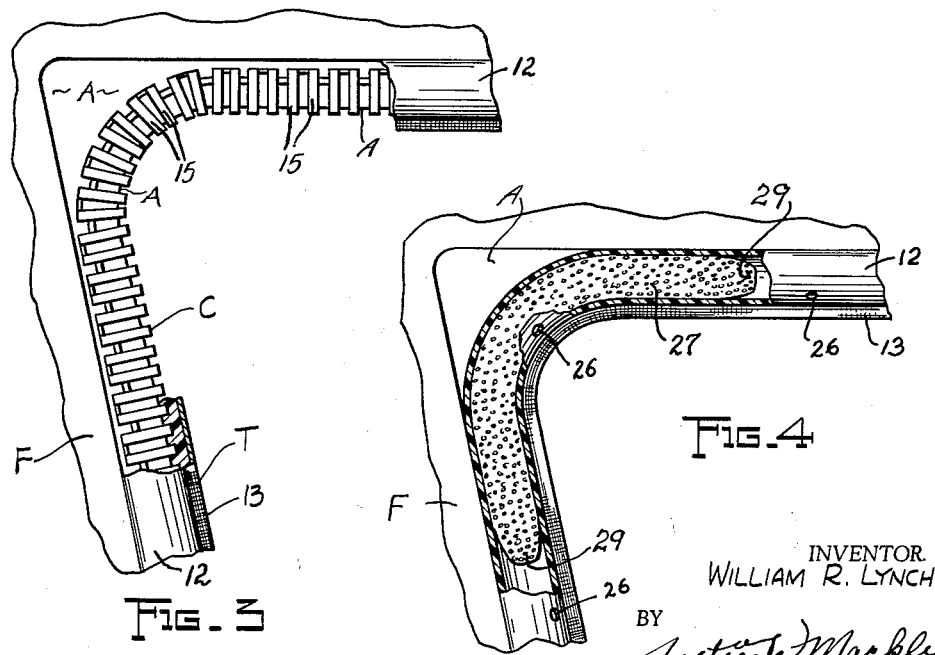
INVENTOR.
WILLIAM R. LYNCH
BY
Justin W. Macklin,
ATTORNEY.

Dec. 8, 1964     W. R. LYNCH     3,159,886
SEALING STRIP WITH FOAMED-IN-PLACE FILLER
Filed April 20, 1962     2 Sheets-Sheet 2
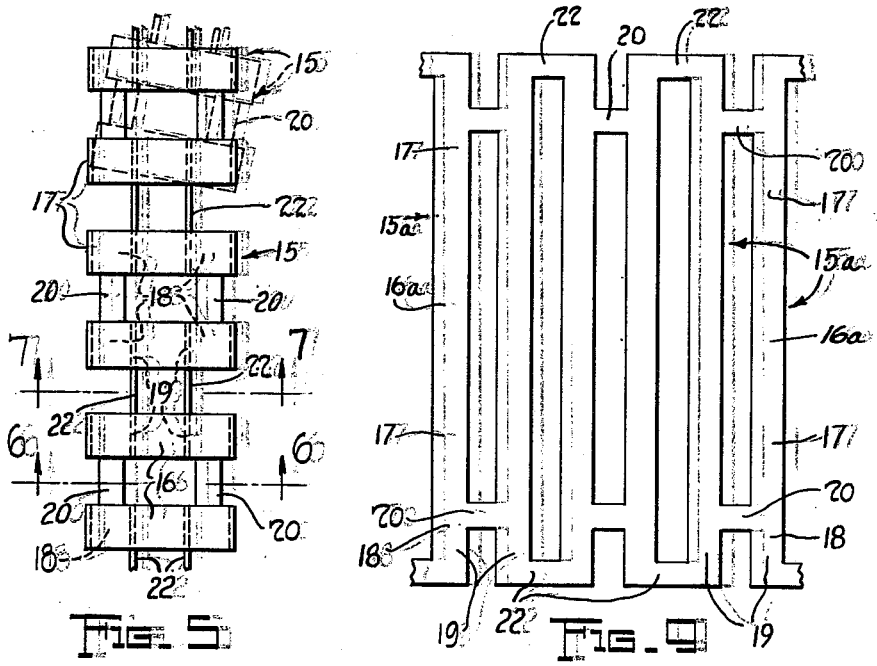
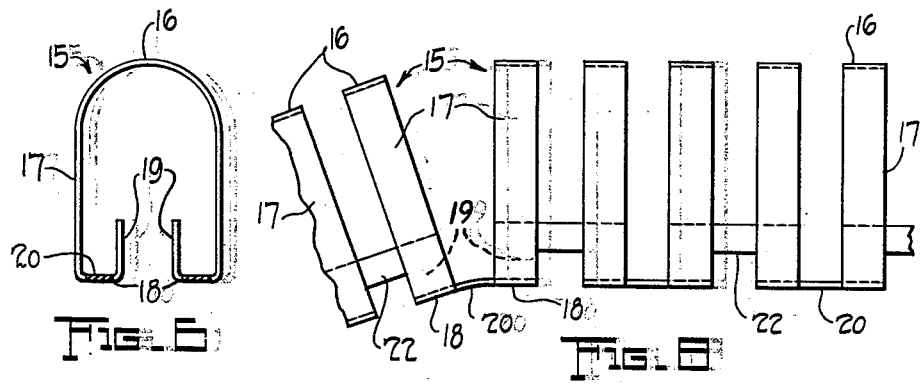
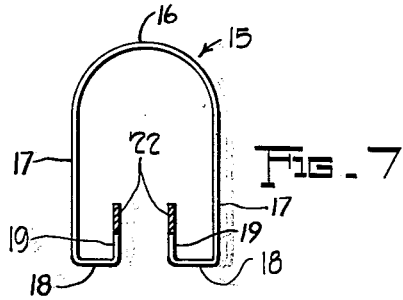
INVENTOR.
WILLIAM R. LYNCH
BY
ATTORNEY.

United States Patent Office 3,159,886
Patented Dec. 8, 1964

3,159,886
SEALING STRIP WITH FOAMED-IN-PLACE
FILLER
William R. Lynch, Birmingham, Mich., assignor to Republic Industrial Corporation, New York, N.Y., a corporation of Delaware
Filed Apr. 20, 1962, Ser. No. 189,157
4 Claims. (Cl. 20—69)

This invention relates to an improved flexible resilient sealing strip for use as trim, weather strip, marginal seals, draft-excluding beads and the like.

Objects of the present invention include the provision of a specially shaped resilient sealing trim or weather strip having a longitudinally extending flexible tube with portions of its length containing a resilient filler serving to prevent crimping or transverse collapsing of the tube when it is curved on a relatively short radius.

Reference may be had to my copending application, Serial No. 114,732, filed June 5, 1961, wherein I have described and claimed a flange gripping flexible sealing-strip carrier of the type which is frequently employed in attaching trim or weather stripping to the doors or door frames of automobiles. While that structure and the present improved structure are particularly adapted for use with doors or door frames of automobiles, these devices may also be employed as sealing strips in door and window openings of other structures, e.g., refrigerators.

In connection with the installation of automobile doors, it is desirable to seal the door against leakage while providing a decorative trim which, in addition, may compensate for and render unnoticeable any misalignments between the door and the frame.

One of the features of the gripping channel section of my prior application is its ability to be bent on curves of short radii to fit into sharply curved corners without unsightly distortion of the trim carried thereby, and which also is capable of being disposed on flanges laterally offset along its longitudinal direction without unduly straining the metal comprising the carrier or lessening its gripping action.

When the trim and flange-gripping channel, such as shown in my above identified patent application, carries a tubular sealing section, it may be fitted into corner portions on radii so short that the tubular seal is crimped or partially collapsed. The present invention overcomes this difficulty.

The principles of this invention are applicable to other prior devices as well as to the improved trim of my aforesaid application.

The present invention will be better understood by having reference to the annexed drawings which are illustrative of a preferred embodiment of the present invention, it being understood that these drawings are merely illustrative of one form of the invention and not limiting of the invention to the precise scope thereof.

In the annexed drawings:

FIG. 1 is a side elevation of an automobile door frame equipped with the combination carrier trim and seal in accordance with the teachings of the present invention, the view showing the exterior side of the door frame on the left-hand side of an automobile;

FIG. 2 is an enlarged cross-section through the door frame of FIG. 1, taken on a plane which may be located as indicated by the line 2—2 of FIG. 1, but with a fragmentary section of a flange or off-set of an automobile door being added in the position in which it would engage the carrier trim and seal of FIG. 1 when the door is closed;

FIG. 3 is a view in elevation on an enlarged scale, illustrating the corner arrangement as appears at the upper left portion of the door frame show in FIG. 1, portions of the covering of the carrier channel, and a somewhat longer portion of the tubular sealing member, being removed in order to more clearly illustrate how the carrier accommodates itself to a short radius of curvature or a relatively sharp corner;

FIG. 4 is a view in elevation on an enlarged scale, again illustrating the upper left portion of the door frame of FIG. 1, but having cut away only a portion of only the tubular sealing member in order to illustrate more clearly the reinforcing means of the present invention;

FIG. 5 is a plan view of a portion of a preferred carrier element, also showing in broken lines a bending action of one part with relation to the other (flexing a pair of parallel ribbon bridge connections) and in a direction laterally of the medial plane of the U-shaped elements;

FIG. 6 is a transverse sectional view on the same scale taken between two of the U-shaped clamping elements, as indicated by the line 6—6 of FIG. 5;

FIG. 7 is a similar sectional view taken between the next alternate pair of U-shaped flange elements, and indicated by the line 7—7 of FIG. 5;

FIG. 8 is a fragmentary view of a number of the U-shaped clamping elements and indicating a bend between two adjacent pairs in a direction flexing the connections appearing in section in FIG. 6;

FIG. 9 is a plan view of a short portion of the blank from which the form shown particularly in FIGS. 3 and 5-8 is formed.

Briefly stated then, the present invention is in the provision in a flexible sealing strip for trim, marginal seals, weather seals, and the like, of a flexible tubular sealing member, e.g., a rubber tube. In order to prevent crimping or any partial collapse of the side walls of the flexible tubular sealing member in those regions where the tubular member is bent on a short radius, there is provided a plurality of longitudinally discontinuous portions of foamed-in-place elastomeric resinous material, e.g., an isocyanate foam, which coacts with the sealing member to prevent collapse thereof.

In FIGS. 1, 2, and 3, a door frame portion of the left-hand side of an automobile body is shown surrounding a door opening, the opening being labeled on the drawing for clarity. Around the door opening, a door-sealing trim strip T is mounted for sealing engagement with a door (not shown in FIG. 1) in the manner illustrated in FIG. 2 and for providing a decorative interior trim about the door opening. As shown in FIG. 2, a door frame flange A is formed by edges of the sheet metal of the body frame, the flange extending continuously around the periphery of the door opening. In some structures, a portion of the flange A may be of one thickness of metal, and other portions may be formed of two thicknesses (as shown) or more.

Straddling the flange A is a resilient flexible securing or carrier channel C constructed in accordance with the principles of my prior application, Serial No. 114,732. Carrier channel C is enveloped by a resilient, flexible material 10, such as rubber or plastic, which extends around the outer portion of the sections of the carrier channel and between it and the door frame F, and then inwardly between gripping leg portions of the channel and the frame flange A where the leg portions are pressed tightly toward the flange A by a spring pressure developed in the leg portions of the channel.

The trim assembly T may comprise one or more lengths of the trim fitted end-to-end around the periphery of the door opening in a continuous manner.

In the preferred embodiment shown in FIG. 2, the rubber or plastic material 10 extending around the carrier channel as shown and described is provided with an inegral, hollow, tubular type of sealing portion 12, preferably positioned to be engaged by a flange or off-set D of the automobile door when it is in closed position.

The portions of the rubber or plastic material 10 that extend around and over the outside of the carrier channel C may be covered by a decorative covering material or fabric, indicated at 13 in FIGS. 2, 3, and 4. The preferred carrier channel is made from a length of continuous strip, cut and bent to form successive, evenly spaced, interconnected, U-shaped, gripping or clamping sections 15, each constituting a gripping clip adapted to straddle and embrace the sides of the frame flange A. All of these U-shaped gripping sections 15 are integral parts of a continuous length of the carrier channel.

The U-shaped gripping sections 15 each comprise a section which is relatively short longitudinally of the carrier and which has a central arch or bend 16, parallel legs or sides 17, inturned portions 18 and parallel, gripping, end pads 19 extending parallel to each other and inwardly of the carrier channel toward the arch portion 16 thereof (FIG. 6). The individual U-shaped sections 15 are separated longitudinally of the strip, preferably by a distance comparable to their width.

The inwardly extending portions 18 of each successive, separate pair of U-shaped sections 15 are connected by bridging ribbon portions 20 (shown in plan in FIG. 5 and in section in FIG. 6). These bridging portions 20 lie in the same plane with the inturned sections 18 and are integral therewith. The adjacent U-shaped sections 15 of two such successive, separate pairs are integrally connected in a similar manner at their inwardly extending, parallel end portions 19 by similar bridging ribbon portions 22 (shown in plan in FIG. 5 and in section in FIG. 7). To form this carrier channel with adjacent, U-shaped sections 15 alternately interconnected by the bridging elements 20 and 22, lying alternately in planes at right angles to each other (i.e., normal to the flange A and parallel to the flange A, respectively), a suitable blank is prepared as shown in FIG. 9.

The blank of FIG. 9 is cut from a length of flat thin, resilient material, such as spring steel, or other suitable sheet metal. Portion are cut out from the strip of which the blank is formed so as to leave some parts which, when the blank has been bent to the configuration described, correspond to those previously designated by the same reference numerals that are applied to FIG. 9. The individual, U-shaped sections 15 are blanked out as flat, parallel strips 15a, extending from side to side of the blanks, these flat, parallel strips being thereafter bent in their central regions 16a to produce the central arches or bends 16 of the finished carrier channel sections 15. The portions 18 and connecting bridging portions 20 all remain in a common plane that becomes aligned at right angles to the parallel sides 17, while the pad portions 19 and connecting bridging portions 22 on either side of the blank also remain in a common plane that becomes parallel to the sides 17 and to the common plane of the bridging portions formed from the opposite side of the blank.

In the upper portion of FIG. 5, a pair of interconnected U-shaped sections 15 are shown in broken lines in laterally displaced positions. Such displacement is premitted by a bending action that occurs substantially entirely in the parallel bridging members 22 that connect one of the U-shaped sections 15 of the off-set pair to a third, adjacent section. Such lateral displacement of U-shaped sections 15 does not materially alter the normal configuration of any of the bridging portions 20, which maintain substantially their normal relationship with the pairs of sections 15 interconnected thereby.

At the left-hand portion of FIG. 8, an adjacent pair of interconnected, U-shaped sections 15 is shown tipped at an angle with relation to the sections 15 to the right thereof, the necessary bending occurring, in this case, substantially entirely in the bridging portions 20 connecting one of the tipped pair of sections 15 to a third adjacent section. This bending action occurs without materially altering the normal configuration of the bridging portions 22 or their relationship with any of the pairs of U-shaped sections 15 interconnected thereby.

From the foregoing, it will be appreciated that the carrier channel C may be bent with facility in either of the directions described and illustrated in FIGS. 5 and 8, and that the bending occurs essentially only at the thin, flat, bridging portions 20 or 22, according to which is oriented to bend with the lesser resistance. Obviously, compound bending (i.e., in two planes normal to the bridging portions 20 and 22, respectively) may cause bending to occur in both the bridging portions 20 and the bridging portions 22 simultaneously.

Numerous other forms of blanks such as shown in my prior application Serial No. 114,732 may be used in carrying out the principles of the present invention. Moreover, devices such as those shown in the prior art may also be improved in respect to the ability of the tubular member to be accommodated to short radius turns in accordance herewith.

Means are provided for attaching the tubular members in parallel contiguous relationship with the aligned clamping members D and F. As shown (FIG. 2), the tubular member 12 is integral with the rubber or plastic material 10 extending around the outside of the carrier channel, being joined thereto by a connecting portion 25 extending generally tangential to or projecting from the tubular member 12. Other means for attaching the tubular members 12 to the clamping members may be provided.

Referring more particularly to FIG. 4, there is here shown a view of a flexible sealing strip of the present invention from a side opposite to that shown in FIG. 3, and illustrating more clearly the sealing member portion in elevation. The tubular portion 12 is provided with a plurality of spaced perforations 26 at convenient intervals, for example, 6 inches on center, the normal purpose of such perforations being to permit the expulsion of air from the interior of the tubular portion when the latter is compressed as by closing the door D (FIG. 2) to be sealed by such tubular member. The perforations 26 also provide a convenient inlet for the injection of any suitable "foamed-in-place resin" as hereinafter more particularly described.

In routine assembly procedures, those portions of the flexible sealing strips which must conform to corner radii of a door profile which are so short as to cause crimping of a given tubular sealing member 12, are readily predetermined. With this information available, a sufficient quantity of a "foamed-in-place," elastomeric resin may be injected through a selected perforation 26 in an amount sufficient to provide a reinforcing filler 27 of such elastomeric resinous material extending interiorly of the tubular member 12 in each direction from the perforation 26 for the distance desired. When the resin has cured, this reinforcing element 27 in the tubular member will prevent collapse or crimping of the tubular member when it is bent on a short radius. For a sealing tube having an I.D. of 9/16", from 2 cc. to 6 cc. of foamed-in-place resin will be found sufficient to completely fill the tube for a distance of 2" to 6" at either side of the point of injection.

The resins which may be used in improving the structures of my prior application and those of the prior art are normally liquid materials which have a relatively short "pot life" and must be used before the catalytic materials contained therein have initiated the foaming reaction to a point where the material begins to "foam" in the supply container. Materials of this kind are well known and readily available on the market.

In general, such foaming resins include the isocyanate resin which are characterized by the presence of hydroxyl groups which are very reactive with isocyanate groups such as those present in tolyl diisocyanate. When a catalyst is included with a mixture of materials which contain a plurality of hydroxyl groups per molecule and a difunctional diisocyanate, e.g. dibutyltin dilaurate, a resinous composition results. Foaming agents may also be included in the composition which promotes the production of discrete cells within the resinous body of the course of curing. The resultant product is a spongy material which has a flexibility or elasticity which is proportional to the amount of plasticizing agent included in the composition. Thus, the stiffness or resilience of the foamed-in-place resin can be controlled by the amount of plasticizer which is included in the composition.

Prior to the action of the catalytic components of the mixture, it is normally a liquid material which may be injected through the breathing ports or air vents 26 of the tubular members 12. When the liquid polymerizable resinous material foams, there is formed a reinforcing element which extends a predetermined distance to either side of the point of injection in the regions of the tubular member where collapse is likely to be encountered.

Most frequently, the foaming resins useful in accordance herewith are compounded just prior to use by admixing a pre-polymer composition with a reactive composition which initiates and catalyzes foaming and further polymerization within a short period of time after admixture. The composition of the pre-polymer and the initiator-catalyst composition is fluid at an ordinary temperature and may be injected in measured quantities with a device such as a hypodermic syringe.

By the action of the initiator-catalyst composition upon the pre-polymer, foaming and further polymerization simultaneously begin to occur, and the body of the injected liquid reacts and expands to fill a portion of the length of the interior of the tubular sealing member 12. As the reaction mass expands, lead portions of the reaction mass are pushed in opposite directions along the interior of the tube from the point of injection, the tube becoming filled with a spongy elastomeric material for a distance either side of the injection point which is dependent upon the quantity of material introduced, preferably for a distance of from 2 to 6 inches either side of the point of injection for most applications of this reinforcing feature of the invention.

Certain of the polymerizable composition which may be used to produce the spongy filler in situ include ingredients which are adhesively in nature, and hence the discontinuous filler portions in the course of the polymerization and expansion become adhered to the inner surface of the tubular sealing member 12.

Many resinous materials may be foramed in order to produce expanded or cellular resinous materials which are resilient and have the characteristics of sponge rubber. Polyethylene and polypropylene may be expanded to produce flexible, tough, low mositure absorption, abrasion and chemically resistant materials. Polyvinyl chloride foams may be made either with chemical blowing agents or by mechanically mixing a gas into the resin and then polymerizing.

Perhaps the most useful of the foaming plastics are the polyurethanes. Elastomeric polyurethane resins are produced by the chemical interaction between specific polyester resins, water, and polyisocyanates, and obtain their cellular structure by internal carbon dioxide formation. Reference may be had to Patent 2,779,689, Patent 2,787,601, Patent 2,811,493 and Patent 2,871,226 for specific examples of polyurethane resinous compositions which may be used in the practice of the present invention.

A measured "shot" of 4 cc. of polymerizable polyurethane mixture will extend about 2 inches in each direction from the point of injection in a $9/16''$ I.D. tube. The time required per shot averages about 5 seconds, and the material cost per shot of approximately 5 grams is negligible. The time required for curing can be accelerated by the application of heat. For example, accelerated curing can be had in 15 minutes at 150° F. Unaccelerated curing requires a period of approximately 24 hours with ordinary compositions.

When the "shot" is injected, foaming begins to occur, and the leading portions 29 of the expanding resinous mass air harden, forming hardened, skin encased plugs that fill the cross section of the tube 12. These plugs 29 serve a dual purpose. The first is in confining the liquid resin to a small volume so that when the resin expands it completely fills the tube between the plugs. Secondly, the plugs, which may have a configuration substantially as shown in FIG. 4, are readily guided by the tube walls to their respective terminal positions under sufficient resistance to movement to maintain conditions under which the tube will be completely filled, but not so great that the side walls of the tube become distorted.

There has thus been provided an improved, flange-gripping, flexible sealing strip for trim, marginal seals, weather seals, and the like, characterized by a flexible tubular sealing member having disposed interiorly thereof a plurality of discontinuous portions of foamed-in-place elastomeric resinous material which fills the tubular sealing portions along selected segments of its length and prevents transverse distortion when the tube is bent on a curve which would normally cause crimping of its walls.

Other modes of applying the principle of this invention may be employed instead of those specifically set forth above, changes being made as regards the details herein disclosed provided the elements set forth in any of the following claims, or the equivalent of such, be employed.

It is, therefore, particularly pointed out and distinctly claimed as the invention:

1. In a closed, flexible, sealing strip for trim, marginal seals, weather seals, and the like, a flexible tubular sealing member having a plurality of longitudinally spaced air vents in the wall thereof and containing a plurality of discontinuous portions of foamed-in-place, elastomeric, resinous material, each of said portions of elastomeric material having hardened, skin encased, plug portions at each extremity thereof that are united therewith and formed from the same material and that fill the cross-section of the tubular member, said portions of resinous material extending interiorly of said tubular member in each direction from preselected air vents through which said resinous material has been injected and adjacent predetermined region of bending of said tubular member with a curvature which would cause crimping thereof in the absence of said portions of resinous material, and said portions of resinous material coacting with said tubular member to maintain its normal, cross-sectional contour by resisting crimping of its wall when it is bent with such a curvature.

2. In a flange-gripping, flexible, sealing strip for trim, marginal seals, weather seals, and the like including:

(a) an elongated, thin, spring metal, channel having a succession of longitudinally spaced, parallel, U-shaped, transversely extending, gripping elements and thin, narrow, bridging connections between successive gripping elements, (b) a closed, flexible, tubular sealing member substantially coextensive with said integral channel, and (c) means connecting said tubular sealing member and said channel together in closely spaced, parallel relationship over the lengths thereof;

the improvement which comprises:

(d) a plurality of longitudinally spaced air vents in the wall of said tubular member, and (e) a plurality of discontinuous portions of foamed-in-place, elastomeric, resinous material, said portions of resinous material—

(i) having hardened, skin-encased, plug portions united therewith at each extremity thereof and formed from the same resinous material, (ii) filling the interior cross-section of the tubular member in each direction from preselected air vents through which said resinous material has been injected, and (iii) extending along predetermined regions of bending of said tubular member with a curvature sufficient to cause crimping thereof;

whereby said portions of resinous material coact with said tubular member to maintain its normal, cross-sectional contour by internal resistance to such crimping thereof when bent with such a curvature.

3. In a closed, flexible, sealing strip for trim, marginal seals, weather seals, and the like, a flexible, tubular, sealing member having at least one air vent in the wall thereof and containing a foamed-in-place, elastomeric, resinous material extending interiorly of said tubular member in each direction from said air vent, through which said resinous material has been injected, said air vent being located in a predetermined region of bending of said tubular member with a sharp curvature which would cause crimping thereof in the absence of said resinous material therein, and said resinous material filling the interior of said tubular member in each direction from said air vent along said predetermined region of bending for coacting with said tubular member to maintain its normal, cross-sectional contour by resisting crimping of its wall when it is bent with such a curvature.

4. In a flange-gripping, flexible, sealing strip for trim, marginal seals, weather seals, and the like including:

(a) an elongated, thin, spring metal, channel having a succession of longitudinally spaced, parallel, U-shaped, transversely extending, gripping elements and thin, narrow, bridging connections between successive gripping elements, (b) a closed, flexible, tubular sealing member substantially coextensive with said integral channel, and (c) means connecting said tubular sealing member and said channel together in closely spaced, parallel relationship over the lengths thereof;

the improvement which comprises:

(d) an air vent in the wall of said tubular member, located in a predetermined region of bending of the tubular member with a sharp curvature tending to cause crimping thereof, and (e) a foamed-in-place, elastomeric, resinous material injected in said tubular member through said air vent, said resinous material filling the interior cross-section of said tubular member in each direction from said air vent along said predetermined region of bending of said tubular member, whereby said resinous material coacts with said tubular member to maintain its normal, cross-sectional contour by internal resistance to such crimping thereof when bent with such a curvature.

References Cited in the file of this patent

UNITED STATES PATENTS

| | | |
|---|---|---|
| 2,089,669 | Shadford | Aug. 10, 1937 |
| 2,554,452 | Bright | May 22, 1951 |
| 2,686,747 | Wurtz et al. | Aug. 17, 1954 |
| 2,700,197 | Kesling | Jan. 25, 1955 |
| 2,898,626 | Alderfer et al. | Aug. 11, 1959 |

FOREIGN PATENTS

| | | |
|---|---|---|
| 494,402 | Great Britain | Oct. 25, 1938 |